United States Patent [19]

Panek et al.

[11] 4,321,237

[45] Mar. 23, 1982

[54] TREATING HYDROLYSIS RESIDUES FROM PREPARATION OF TITANIUM DIOXIDE

[75] Inventors: Peter Panek; Peter Woditsch, both of Krefeld; Werner Kannchen, Duisburg, all of Fed. Rep. of Germany

[73] Assignee: Bayer Aktiengesellschaft, Leverkusen, Fed. Rep. of Germany

[21] Appl. No.: 213,707

[22] Filed: Dec. 5, 1980

[30] Foreign Application Priority Data

Dec. 21, 1979 [DE] Fed. Rep. of Germany ....... 2951749

[51] Int. Cl.$^3$ ............................................. C01G 23/00
[52] U.S. Cl. ...................... 423/82; 75/1 T; 423/69
[58] Field of Search ................ 423/69, 82, 83; 75/1 T

[56] References Cited

U.S. PATENT DOCUMENTS 2,180,961  11/1939  Kramer ................................ 423/82
2,329,641  9/1943  Moran et al. ........................ 423/82
2,631,924  3/1953  McKinney ............................ 423/86

*Primary Examiner*—Herbert T. Carter
*Attorney, Agent, or Firm*—Sprung, Felfe, Horn, Lynch & Kramer

[57] ABSTRACT

In the process wherein a titanium-containing material is subjected to react with sulphuric acid to form a solid reaction mass from which the titanium values are recovered in solution by digestion with water or dilute sulphuric acid leaving behind a reaction residue and the reaction residue is thereafter treated to recover at least part of the titanium contained therein, the improvement wherein the treatment of the reaction residue is effected by contacting with sulphuric acid of a concentration greater than 86% a mixture by weight comprising about 5 to 95% of the reaction residue and 95 to 5% of a slag having a $TiO_2$ content 60% by weight and a Ti(III) content of about 5 to 40% by weight, and thereafter eventually adding water, steam or dilute sulphuric acid to the mass to start the reaction.

6 Claims, No Drawings

TREATING HYDROLYSIS RESIDUES FROM PREPARATION OF TITANIUM DIOXIDE

The present invention to a process for working up hydrolysis residues obtained in the preparation of titanium dioxide by introducing these residues into a mixture of fine-particled slag and sulphuric acid, preferably fuming sulphuric acid.

The following processes are generally used for the decomposition of titaniferous raw materials: a finely-ground titaniferous material is mixed with concentrated sulphuric acid. To the mixture is then added a small amount of water, steam or dilute sulphuric acid and the heat generated by diluting the concentrated acid initiates the reaction of the titaniferous material and the acid. A porous decomposition cake is thus produced which is soluble in dilute mineral acid or water.

The titaniferous materials give, however, only solubilization yields of about 95% $TiO_2$ in the most favorable case and an insoluble residue remains.

A process for obtaining $TiO_2$ from the ilmenite residue which remains undissolved after the reaction with sulphuric acid is known from published Japanese Patent Application No. 77/41 197. In this process, the residue is mixed with from 3 to 13.5% of sodium chloride or rock salt and heated with concentrated sulphuric acid to a temperature of from 150° to 160° C.

This process operates very uneconomically because it is necessary to supply large quantities of energy. The resulting HCl gas also causes corrosion damage to the apparatus.

German Patent No. F 9827 IV a/12 i describes an alternative process of decomposition of ilmenite with sulphuric acid in admixture with residual matter which is effected without the external supply of energy. The disadvantage of this process is that only in a continuous working method, is ensured the reaction of ilmenite with sulphuric acid in a controlled reaction with a good solubilization yield.

As will be shown later, transferring the process described in German Patent No. F 9827 IV a/12 i to the frequently more advantageous discontinuous working method produces only unsatisfactory results. The titanium dioxide present in the residue can only be decomposed to a limited extent and thus cannot be easily converted into an aqueous solution.

Surprisingly, it has now been found that hydrolysis residues of different types as are produced from the preparation of titanium dioxide, may advantageously be used to obtain the titanium dioxide contained therein, when these hydrolysis residues are reacted together with fine-particled slags containing $TiO_2$ and Ti(III) in sulphuric acid, the success of the process depending considerably on the choice of the reactants and on the ratio in which they are present.

The hydrolysis residues which are used frequently still contain such a large quantity of dilute sulphuric acid that it is unnecessary to add water, water vapor or dilute sulphuric acid to start the reaction.

The present invention therefore provides a process for processing hydrolysis residues obtained in the preparation of titanium dioxide to obtain the titanium dioxide contained therein by a combined reaction with slag in sulphuric acid and by dissolving the resulting reaction mass in an aqueous solvent in which about 5 to 95%, preferably about 30 to 75% of a titaniferous hydrolysis residue is reacted together with from 95 to 5%, preferably from 70 to 25% of fine-particled slag which has a $TiO_2$-content of >60%, preferably >80%, and a Ti(III)-content of about 5 to 40%, preferably about 20 to 35%, calculated as $TiO_2$ and based on the slag, in sulphuric acid which has an $H_2SO_4$-content greater than 86%, in which the reaction may be initiated by adding water, water vapor or dilute sulphuric acid.

In a preferred embodiment of the process of the present invention the titaniferous hydrolysis residue is introduced into a receiver with the fine-particled slag and sulphuric acid with an $H_2SO_4$-content greater than 86% in such a quantity that the ratio of $H_2SO_4$ of $TiO_2$ is about 1.5:1 to 3:1, preferably about 1.7:1 to 2.2:1 and the $H_2SO_4$-concentration after adding all of the components is about 80 to 98%, preferably about 85 to 98%.

In a particularly preferred embodiment of the process according to the invention fuming sulphuric acid with an $SO_3$-content of up to 30% is used as the sulphuric acid.

The titaniferous hydrolysis residues used according to the present process may originate from ilmenite decomposition as well as from slag decomposition and from mixed ilmenite-slag decomposition, which are obtained, for example, after-coarse filtration over a rotary filter treated with a filtration aid and after washing, and may contain the filtration aid, of a sludge from a Dorr thickener. It is not necessary further to pre-treat the hydrolysis residues.

The process according to the invention produces in a simple manner high solubilization yields of $TiO_2$ from both the slag and from the decomposition residues. It requires only the use of sulphuric acid which is also usual in the sulphuric acid decomposition of ores and, after dissolving the reaction mass in an aqueous solvent, such as water or a diluted sulphuric acid, and after clearing, produces titanyl sulphate solutions which are suitable for use directly in hydrolysis. Finally, it allows the reaction to be carried out both continuously or discontinuously and, in the particularly preferred embodiment, when working with fuming sulphuric acid and in the specified mixing ratios of the reactants, it does not require any external energy supply and is thus very economical.

The present process is described in the following examples. Unless indicated otherwise, all amounts are stated in percent by weight.

EXAMPLE 1

The quantities specified in Table 1 of a fine-particled slag [70.8% of $TiO_2$; 7.9% of Ti(III), calculated as $TiO_2$ and based on the slag; 9.9% of Fe] and fuming sulphuric acid (106.1% of $H_2SO_4$) were introduced into a glass vessel equipped with an internal thermometer and a stirrer and effectively insulated on the outside, positioned in a hot air bath able to readjust the internal temperature of the reaction vessel to compensate for heat losses. The quantities also given in Table 1 of an ilmenite-hydrolysis residue containing a filtration aid (39.5% of $TiO_2$; 5.2% of Fe, 8.6% of $H_2SO$; 44.0% ignition loss including the separately expressed $H_2SO_4$ content; up to 10% residue of $SiO_2$-filtration aid) were introduced into this receiver with intensive stirring in such a quantity that the total $TiO_2$-content amounted to 100 g, and the ratio of $H_2SO_4$ to $TiO_2$ was 2,0:1 and the final $H_2SO_4$ concentration was from 88.7 to 96.5%. The temperature in the reaction vessel rose to a level of from 114° to 159° C. and, in an exothermic reaction, after from 14 to 28 minutes finally reached the maximum reaction temperature of from 198° to 216° C. The solidified reaction masses were then maintained at approximately 190° C. for 6 hours and were dissolved by adding 350 ml of water at 70° C. The total solubilization $TiO_2$-yield of the reactions (dissolved $TiO_2$ based on total $TiO_2$) was from 87 to 91.5%. Since the $TiO_2$-yield of the slag used is 95% under similar reaction conditions, it is calculated that from 71.4 to 86.4% of the $TiO_2$-contents of the ilmenite-hydrolysis residues are solubilized.

TABLE 1

| Processing an ilmenite-hydrolysis residue with slag and fuming sulphuric acid | | | | | | |
|---|---|---|---|---|---|---|
| Slag (g) | 108.6 | 103.0 | 97.0 | 90.7 | 84.0 | 76.9 |
| Slag % | 65 | 60 | 55 | 50 | 45 | 40 |
| Ilmenite residue (g) | 58.5 | 68.6 | 79.3 | 90.7 | 102.6 | 115.3 |
| Ilmenite residue (%) | 35 | 40 | 45 | 50 | 55 | 60 |
| Fuming sulphuric acid | 206.7 | 205.8 | 204.8 | 203.8 | 202.9 | 201.7 |
| Final $H_2SO_4$ concentration (%) | 96.5 | 95.0 | 93.5 | 92.0 | 90.4 | 88.7 |
| Mixing temperature (°C.) | 114 | 124 | 124 | 152 | 151 | 159 |
| Max. reaction temperature (°C.) | 216 | 211 | 203 | 204 | 199 | 198 |
| Time until max. reaction temperature from end of mixing (min) | 21 | 24 | 28 | 18 | 17 | 14 |
| $TiO_2$-yield (%) (total) | 89.4 | 91.3 | 90.1 | 89.8 | 91.5 | 87.0 |
| $TiO_2$-yield (%) (residue, where $TiO_2$ yield of the slag = 95%) | 71.4 | 81.2 | 79.6 | 80.4 | 86.4 | 77.6 |

Comparative Example

For comparison, the quantities specified in Table 2 (not corresponding to the present invention) of a fine-particled ilmenite (60.2% of TiO; 25.0% of Fe; Fe(III) to Fe(II)=2.29:1) and fuming sulphuric acid (106.1% of $H_2SO_4$) where introduced into the apparatus used in Example 1. The quantities also specified in Table 2 of the ilmenite-hydrolysis residue containing filtration aids and used as in Example 1 (39.5% of $TiO_2$; 5.2% of Fe; 8.6% of $H_2SO_4$; 44.0% ignition loss including the separately expressed $H_2SO_4$-content, approximately 10% of $SiO_2$) were then introduced with intensive stirring into this receiver in such a quantity that the total $TiO_2$-content was 100 g, the ratio of $H_2SO_4$ to $TiO_2$ was 2.0:1 and the final $H_2SO_4$ concentration was from 88.9 to 96.7%. Thereby, the temperature in the vessel rose to a value of between 130° and 194° C. and in an exothermic reaction after from 3 to 6 minutes finally reached the maximum reaction temperatures of from 196° to 220° C.

The solidified reaction masses were then maintained at 180° C. for 3 hours and were dissolved by adding 350 ml of water at 70° C. The total solubilization $TiO_2$-yield of the reaction (dissolved $TiO_2$, based on total $TiO_2$) was from 74 to 84.3%. As the $TiO_2$ yield of the ilmenite used is 93% under similar reaction conditions, it is calculated that from 28.5 to 73.4% of $TiO_2$-contents of the ilmenite-hydrolysis residues used are solubilized. Therefore, it is clearly lower than is obtained according to the process of the invention in Example 1.

TABLE 2

| Processing an ilmenite-hydrolysis residue with ilmenite and fuming sulphuric acid | | | | | | |
|---|---|---|---|---|---|---|
| Ilmenite (g) | 122.7 | 115.6 | 108.1 | 100.3 | 92.2 | 83.7 |
| Ilmenite (%) | 65 | 60 | 55 | 50 | 45 | 40 |
| Ilmenite residue (g) | 66.1 | 77.0 | 88.4 | 100.3 | 112.7 | 125.6 |
| Ilmenite residue (%) | 35 | 40 | 45 | 50 | 55 | 60 |
| Fuming sulphuric acid (g) | 239.6 | 236.8 | 233.7 | 230.6 | 277.2 | 223.9 |
| Final $H_2SO_4$ concentration (%) | 96.7 | 95.2 | 93.7 | 92.2 | 90.6 | 88.9 |
| Mixing temperature (°C.) | 130 | 139 | 163 | 178 | 192 | 194 |
| Max. reaction temperature (°C.) | 220 | 214 | 204 | 199 | 196 | 199 |
| Time until max. reaction temperature from end of mixing (min) | 6 | 4 | 4 | 4 | 4 | 3 |
| $TiO_2$-yield (%) (total) | 81.2 | 74.0 | 77.9 | 81.9 | 84.3 | 79.1 |
| $TiO_2$-yield (%) (residue, where $TiO_2$ yield of the ilmenite = 93%) | 28.5 | 30.5 | 49.8 | 54.3 | 73.4 | 65.0 |

EXAMPLE 2

According to the invention, the quantities specified in Table 3 of a fine-particled slag (85.1% of $TiO_2$; 30.2% of Ti(III), calculated as $TiO_2$ and based on the slag; 9.5% of Fe) and fuming sulphuric acid (106.1% of $H_2SO_4$) were introduced into the apparatus already used in Example 1. The quantities also specified in Table 3 of the ilmenite-hydrolysis residue containing filtration aids and used as in Example 1 (39.5% of $TiO_2$; 5.2% of Fe, 8.6% of $H_2SO_4$; 44.0% ignition loss including the separately expressed $H_2SO_4$-content, approximately 10% of $SiO_2$) were then introduced into this receiver with intensive stirring in such a quantity that the total $TiO_2$-content was 100 g, the ratio of $H_2SO_4$ to $TiO_2$ was 2.0:1 and the final $H_2SO_4$-concentration was from 87.7 to 96.1%.

The temperature in the vessel rose to a value of between 110° and 155° C. and, in an exothermic reaction, after from 11 to 20 minutes finally reached the maximum reaction temperature of from 185° to 215° C. The solidified reaction masses were then maintained at 190° C. for 6 hours and were dissolved by adding 350 ml of water at 70° C. The total $TiO_2$-yield of the reactions (dissolved $TiO_2$ based on total $TiO_2$) was from 91.5 to 94.5%. Since the $TiO_2$-yield of the slag used is 97% under similar reaction conditions it is calculated that from 84.8 to 88.0% $TiO_2$-contents of the ilmenite-hydrolysis residues used are solubilized.

TABLE 3

| Processing an ilmenite-hydrolysis residue with slag and fuming sulphuric acid | | | | | | |
|---|---|---|---|---|---|---|
| Slag (g) | 89.7 | 85.2 | 80.3 | 75.0 | 69.3 | 60.9 |
| Slag (%) | 60 | 55 | 50 | 45 | 40 | 35 |
| Ilmenite residue (g) | 59.8 | 69.7 | 80.3 | 91.6 | 103.9 | 121.9 |
| Ilmenite residue (%) | 40 | 45 | 50 | 55 | 60 | 65 |
| Fuming sulphuric acid (g) | 202.0 | 202.2 | 201.5 | 200.8 | 199.6 | 198.7 |
| Final $H_2SO_4$ concentration (%) | 96.1 | 94.7 | 93.2 | 91.6 | 90.0 | 87.7 |
| Mixing temperature (°C.) | 110 | 121 | 145 | 148 | 152 | 155 |
| Max reaction | 221 | 214 | 201 | 204 | 198 | 191 |

TABLE 3-continued

| Processing an ilmenite-hydrolysis residue with slag and fuming sulphuric acid | | | | | | |
|---|---|---|---|---|---|---|
| temperature (°C.) | | | | | | |
| Time until max. reaction temperature from end of mixing (min) | 18 | 20 | 20 | 13 | 11 | 13 |
| TiO$_2$-yield (%) (total) | 94.1 | 94.5 | 94.1 | 93.4 | 92.1 | 91.5 |
| TiO$_2$-yield (%) (residue, where TiO$_2$ yield of the slag = 97%) | 84.8 | 88.0 | 87.7 | 87.0 | 95.1 | 85.5 |

It will be understood that the specification and examples are illustrative but not limitative of the present invention and that other embodiments within the spirit and scope of the invention will suggest themselves to those skilled in the art.

We claim:

1. In the process wherein a titanium-containing material is subjected to reaction with sulphuric acid to form a solid reaction mass from which the titanium values are recovered in solution by hydrolysis with water or dilute sulphuric acid leaving behind a hydrolysis residue and the hydrolysis residue is thereafter treated to recover at least part of the titanium contained therein, the improvement wherein the treatment of the hydrolysis residue is effected by contacting by weight about 5 to 95% of the hydrolysis residue and the balance to 100% thereof of a slag having a TiO$_2$ content >60% by weight and a Ti(III) content of about 5 to 40% by weight with sulphuric acid of a concentration greater than 86%, and thereafter optionally adding water, steam or dilute sulphuric acid to start the reaction.

2. A process according to claim 1, wherein the treatment of the decomposition residue is effected by contacting by weight about 30 to 75% of the reaction residue and the balance thereof of the slag.

3. A process according to claim 1 or 2, wherein the slag has a total TiO$_2$ content >80% by weight and a Ti(III) content, calculated as TiO$_2$ and based on the slag, of about 20 to 35% by weight.

4. A process according to claim 1 or 2, wherein the titanium containing decomposition residue is added to a receiver containing the slag and sulphuric acid of a concentration greater than 86% in such a proportion that the ratio of H$_2$SO$_4$ to TiO$_2$ is from about 1.5:1 to 3:1 and the H$_2$SO$_4$ concentration after adding all the components is from about 80 to 98%.

5. A process according to claim 1 or 2, wherein the titanium containing decomposition residue is added to a receiver containing the slag and sulphuric acid of a concentration greater than 86% in such a proportion that the ratio of H$_2$SO$_4$ to TiO$_2$ is from about 1.7:1 to 2.2:1 and the H$_2$SO$_4$-concentration after adding all the components is from about 85 to 95%.

6. A process according to claim 1 or 2, wherein the sulphuric acid contacted with the decomposition residue and the slag is fuming sulphuric acid with a SO$_3$-content of up to about 30%.

* * * * *